United States Patent
Seeley et al.

(10) Patent No.: US 6,530,977 B2
(45) Date of Patent: Mar. 11, 2003

(54) ABATEMENT OF SEMICONDUCTOR PROCESSING GASES

(75) Inventors: Andrew James Seeley, Bristol (GB); James Robert Smith, Blackford (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/796,846

(22) Filed: Mar. 1, 2001

(65) Prior Publication Data
US 2001/0032543 A1 Oct. 25, 2001

(30) Foreign Application Priority Data
Mar. 3, 2000 (GB) .............................................. 0005231

(51) Int. Cl.[7] .............................................. B01D 47/00
(52) U.S. Cl. .............................. 95/149; 95/227; 96/243; 96/270; 96/271
(58) Field of Search ..................... 95/179, 227; 96/372, 96/379, 322, 270, 271, 273, 243

(56) References Cited

U.S. PATENT DOCUMENTS

| | | | | |
|---|---|---|---|---|
| 3,036,418 A | * | 5/1962 | Kunzer et al. | |
| 3,681,895 A | * | 8/1972 | Zirngibl et al. | |
| 4,968,336 A | | 11/1990 | Reimanis et al. | |
| 5,261,949 A | * | 11/1993 | Schilling | |
| 5,716,428 A | * | 2/1998 | Imamura | |
| 5,738,699 A | | 4/1998 | Hu et al. | |
| 5,800,792 A | * | 9/1998 | Ibraki et al. | |
| 6,153,150 A | * | 11/2000 | Moore et al. | |
| 2001/0032543 A1 | * | 10/2001 | Seeley et al. | |

FOREIGN PATENT DOCUMENTS

WO WO 00/01465 1/2000

* cited by examiner

Primary Examiner—Duane S. Smith
(74) Attorney, Agent, or Firm—Ira Lee Zebrak; Salvatore P. Pace

(57) ABSTRACT

A method for the abatement of one or more pyrophoric gases in a gas stream, which includes introducing water in to the gas stream and/or mixing the gas stream with preheated air and introducing the gas stream in to a container in which the pyrophoric gases are abated.

16 Claims, 1 Drawing Sheet

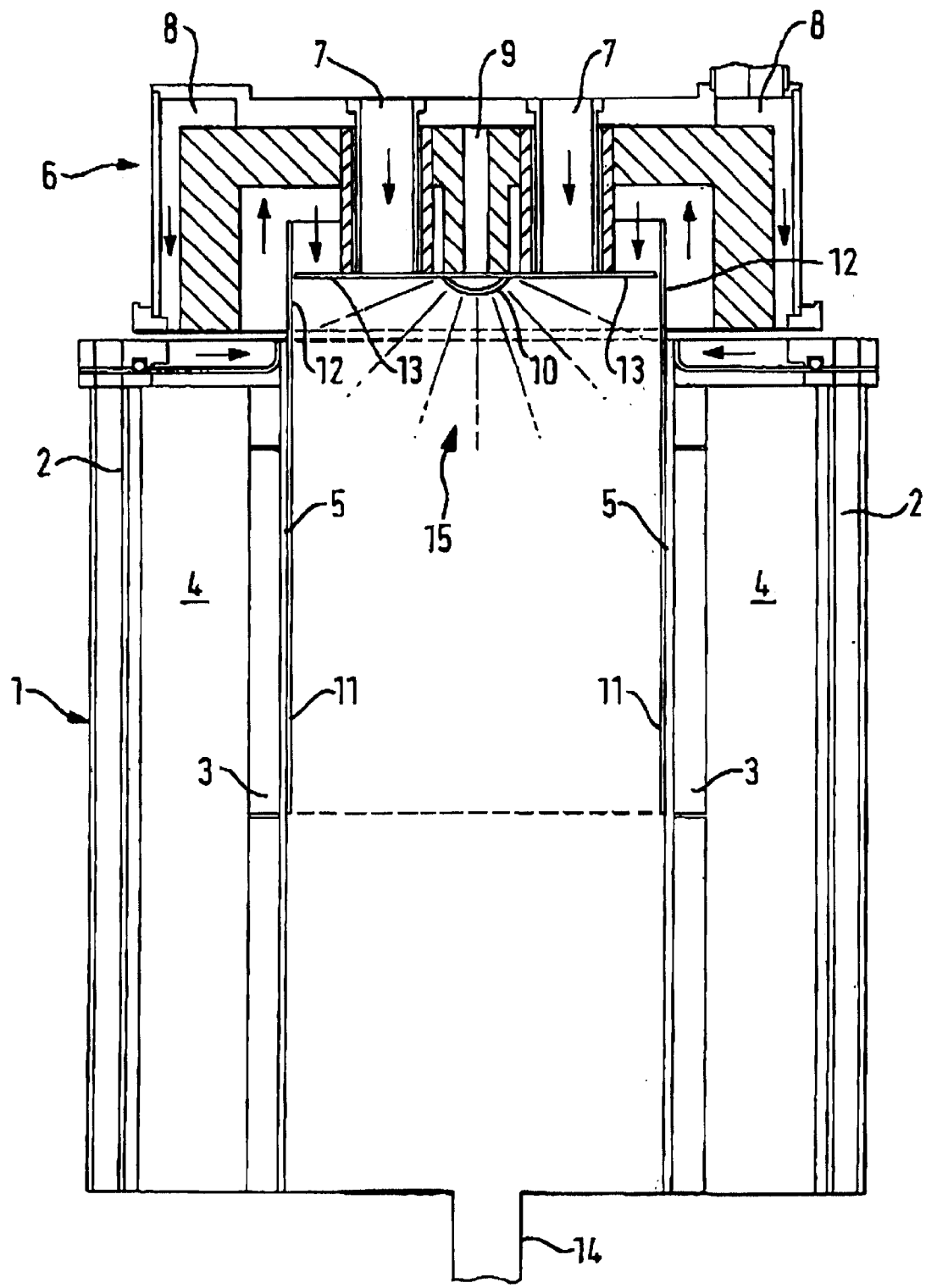

ABATEMENT OF SEMICONDUCTOR PROCESSING GASES

FIELD OF THE INVENTION

This invention relates to the abatement of semiconductor processing gases and, more particularly, to the abatement of such gases exhibiting pyrophoric properties.

BACKGROUND OF THE INVENTION

The use of pyrophoric gases for use in the processing of semiconductor products, for example wafers, is well known. They include silane, disilane, dichlorosilane, trichlorosilane, arsine and phosphine and are generally used in order to deposit process layers on to silicon wafers or flat panel displays.

Pyrophoric gases can pose a special risk in that they may cause a spontaneous and uncontrolled pyrophoric reaction on contact with air inside the pipework or other components of the processing apparatus and including the ventilation ducts thereof.

In order to minimise the risk of an uncontrolled pyrophoric reaction inside the processing apparatus, it is known to employ a "burn box" which is designed to lessen any reaction or to enable a controlled and contained pyrophoric reaction to occur. Such a burn box is typically 1 to 7 meters in length and 10 to 20 centimetres in diameter and commonly relies in a ventilation duct to draw cold air through the system.

A further development from the burn box is the use of a thermal reaction tube or burn tube. In this case, the tube itself may be heated, for example an electric heater; however, the pyrophoric gases and the air are introduced in to the tube without any preheating in that such preheating is deemed unnecessary and undesirable. In addition the pyrophoric gases and the air are substantially or completely dry.

However, burn tubes are not without their difficulties. There is a need absolutely to avoid the presence of laminar air flow in the tube which could otherwise lead to an incomplete oxidation of the pyrophoric gases, especially at higher concentrations and, which may result in potentially unstable oxide formation and some unnecessary oxidation of the gases. Although turbulent flow can be readily induced in the tube through the general flow of pyrophoric gas and air in to the tube, certain difficulties can still remain.

The invention is concerned with the provision of an improved method/apparatus for the abatement of pyrophoric gases in particular and providing an improved certainty of abatement and an improved efficiency. The invention is also concerned, separately, at removing particulates from the container in which the abatement is being conducted.

SUMMARY OF THE INVENTION

In accordance with the invention, there is provided a method for the abatement of one or more pyrophoric gases in a gas stream, which comprises introducing water in to the gas stream and/or mixing the gas stream with preheated air.

In a first embodiment of the invention, the water is introduced in to the gas stream in the form of damp air. The water vapour thus mixed with the gas stream has been found to be beneficial in promoting the oxidising reactions required to abate the pyrophoric gas(es) contained therein.

Preferably the damp air has a relative humidity of at least 50%, more preferably at least 90% and most preferably at least 95%. The water is preferably introduced by bubbling the air through a volume of water.

In a second embodiment of the invention, air to be mixed with the gas stream is preheated prior to mixing. An air temperature of at least 300° C., for example 350° C. to 500° C., is preferred.

The gas stream and air are preferably mixed prior to entry in to the container. A nominal air temperature of 400° C. is most preferred. It is also advantageous for the container in to which the exhaust gas stream and the preheated air are introduced is itself heated in order to retain and increase the elevated temperature of the air and hence of the exhaust stream as well.

In most preferred embodiments, the first and second embodiments are combined.

In preferred aspects, the invention also provides apparatus for carrying out the invention comprising a container, means for the supply of a gas stream containing one or more pyrophoric gases therein, means for the supply of damp air therein, means to cause the gas stream and the damp air to be separately introduced in to the container and means to heat the damp air prior to its entry in to the container.

The means to heat the air is advantageously a heated fin, preferably of metal, arranged adjacent the supply of the air in to the chamber. A copper fin is preferred for its heat conductor properties.

The inside of the container may also be heated and a particularly preferred feature for the heating means is a heated sleeve, preferably of metal and cylindrical in shape, which extends in to the container and is heated by a heater, for example a resistance heater in the body of the container, to conduct heat to the region where the cold gas is to be heated and advantageously for heating the container generally. In such embodiments, it is preferred for one end of the heater sleeve to form the heated fin.

Abatement of pyrophoric gases commonly results in the formation of solid or particulate materials which may adhere to the inner surfaces of the burn tube or container in which the abatement is taking place. Such solid materials can thus restrict the flow of gas through the container and may form a thermal insulation layer which can reduce the surface temperature of the containers inner walls and cause the reactions in the container to subside.

Third embodiments of the invention are concerned with minimising such difficulties.

In accordance with such third embodiments, there is provided a method for reducing the build up of solid or particulate materials in heated inner surfaces of a container in which pyrophoric gases are being abated which includes means to spray water in to the container.

The water should be sprayed in a manner which causes the water to impinge on to the hot, solid- or particulate-lined container surfaces.

The water is preferably introduced in the form of a spray at the top of the container. The water is advantageously sprayed intermittently for a duration of, for example, from 1 to 15 seconds, more preferably from 5 to 10 seconds. Pressures of from 1 to 6 bar, more preferably from 3 to 5 bar can usefully be employed. When used to spray the solid- or particulate-lined container surfaces heated to a temperature of, for example between 500° C. and 1000° C., it has been found that the resulting explosive boiling of the water on to he surfaces causes the solid/particulates to be effectively removed and washed away.

BRIEF DESCRIPTION OF THE DRAWING

For a better understanding of the invention, reference will now be made to the accompanying drawing which shows a schematic cross-section of apparatus for carrying out a method of the invention.

DETAILED DESCRIPTION OF THE DRAWING

With reference to the drawing, there is shown a container 1 having an outer cylindrical wall 2 and an inner cylindrical wall 3. Sandwiched between the walls 2 and 3 is an insulating material 4 and, at the top half of the container, an electrical heater 5.

In a top portion 6 of the container 1 are defined various passageways as follows:

- a series of inlets 7 for the entry of exhaust gases in to the container 1.
- a series of inlets 8 for the entry of air in to the container 1.
- an inlet 9 for the entry of water in to the container 1 via a spray head 10.

The inner cylindrical wall 3 has a sleeve 11 inserted in the top half thereof, a portion 12 of which extends upwardly (all as shown) in to the top portion 6 of the container 1. The sleeve 11 is made of copper for optimum heat conductance properties.

Whereas the inlets 7 allow entry of exhaust gases directly in to the chamber 1, the top portion 6 is designed such that cold air is directed (under an external pressure source) from the inlets 8 as indicated by the arrows in the drawing and is brought in to contact with the portion 12 of the sleeve 11 and thence in to contact with an apertured plate 13 surrounding the inlets 7.

Treated gas exits the container 2 by means of an outlet 14 at the bottom thereof.

In use of the apparatus, both the sleeve 11 and the plate 13 are heated (the former by the heater 5 and the latter by means not shown) to, for example, 400° C. so that the air flowing in to the container 1 through the inlets 8 is heated by contact therewith and enters the container 1 at an elevated temperature.

A flow of water can be effected in to the container 1 through the inlet 9 from an external water source and sprayed across the inner walls of the sleeve 11 in particular but also across the lower internal wall of the container 1.

In normal use of the apparatus shown in the drawing, cold air is urged in to the container 1 via the inlets 8 from an external pressurised source, for example a cylinder. The air is heated by contact with the heated portion 12 and the plate 13 and then mixes at the top of the container 1 with a gas stream containing one or more pyrophoric gases entering the chamber via the inlets 7 from, for example, a semiconductor processing chamber under the action of one or more vacuum pumps.

In comparative experiments conducted in the apparatus shown in the drawing:

a) with clean, dry air (CDA) entering the container 1 via the inlets 8 at a rate of 500 l/min and with 250 sccm silane ($SiH_4$) premixed with 50 slm nitrogen ($N_2$) entering the container 1 via the inlets 7, and with the electrical heater 5 controlled at 850° C., it was determined that the gas flow out of the bottom (as shown) of the container 1 contained 21 ppm $SiH_4$, a silane destruction efficiency of 54%.

b) when the air entering the container 1 contained 1.5% by volume water vapour, a corresponding silane destruction efficiency of 62% was observed.

c) when the CDA of experiment a) was heated by having the sleeve 11 at a temperature of 400° C., a corresponding silane destruction of greater than 78% was observed.

d) when the damp air of experiment b) was heated by having the sleeve 11 at a temperature of 400° C., 3 ppm of silane was detected at the bottom of the container 1 and a corresponding silane destruction efficiency of 95% was observed.

As noted above, the burning of pyrophoric gas in a burn tube of the above type and generally, tends to lead to solid/particulate formation which may adhere to the inner walls of the container 1. The gas stream containing the pyrophoric gases also may well have solids entrained therein.

In accordance with the invention, such solid/particulate build-up may be removed by causing a quantity of water to impinge on the heated internal walls.

This was achieved with the apparatus of the invention shown in the drawing by causing a flow of cold water in to the container 1 via the water inlet 9 and the centrally located spray head 10 and thereby causing a spray 15 throughout the container 1.

The water spray is preferably intermittent, for example once per hour or even once per day. The water pressure is advantageously from 1 to 6 bar, most preferably from 3 to 5 bar and the time of spray is advantageously from 1 to 15 seconds, most preferably from 5 to 10 seconds.

Adequate cleaning of the heated wall of the container 1 is thereby effected. The debris that results is thermally shocked and this causes further break-up and enables it to be washed away by the water flow.

We claim:

1. A method for the abatement of one or more pyrophoric gases in a gas stream, which comprises introducing water in to the gas stream and mixing the gas stream with preheated air and introducing the gas stream in to a container in which the pyrophoric gases are abated.

2. The method according to claim 1 in which the water is introduced in to the gas stream in the form of damp air.

3. The method according to claim 2 in which the damp air has a relative humidity of at least 50%.

4. The method according to claim 2 in which the damp air has a relative humidity of at least 90%.

5. The method according to claim 1 in which the preheated air has a temperature of at least 300° C.

6. The method according to claim 1 in which the preheated air has a temperature of from 350° C. to 500° C.

7. The method according to claim 1 in which the gas steam and air are mixed prior to entering in to the chamber.

8. The method according to claim 1 in which the container in to which the exhaust gas stream and the preheated air are introduced has heating means in order to retain and increase the elevated temperature of the air and hence of the exhaust stream as well.

9. The method according to claim 8 in which the heating means heats the air and is in the form of a heated fin arranged adjacent the supply of the air in to the chamber.

10. The method according to claim 8 in which the heating means heats the inside of the chamber.

11. The method according to claim 9 in which the heating means is a heated sleeve which extends in to the container and is heated by a heater to conduct heat to the region where the cold gas is to be heated.

12. The method according to claim 9 in which one end of the sleeve forms the heated fin.

13. An apparatus for abating one or more pyrophoric gases in a gas stream comprising a container, means for allowing the introduction of air and a pyrophoric gas containing stream in to the container, means to heat the air prior to it being mixed with the pyrophoric gas stream and means for discharging the treated gas stream.

14. The apparatus as claimed in claim 13 wherein said means to heat air is a heated fin arranged adjacent to said air introduction means.

15. The apparatus as claimed in claim 13 wherein said means to heat air is heated sleeve which extends into said container.

16. The apparatus as claimed in claim 13 further comprising means to spray water into said container.

* * * * *